(12) United States Patent
 Lei et al.

(10) Patent No.: US 8,831,923 B2
(45) Date of Patent: Sep. 9, 2014

(54) METHOD AND SYSTEM FOR DETERMINATION OF HORIZONTAL STRESSES FROM SHEAR RADIAL VARIATION PROFILES

(75) Inventors: Ting Lei, Cambridge, MA (US); Bikash Sinha, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 489 days.

(21) Appl. No.: 12/892,336

(22) Filed: Sep. 28, 2010

(65) Prior Publication Data

US 2011/0077920 A1 Mar. 31, 2011

Related U.S. Application Data

(60) Provisional application No. 61/246,761, filed on Sep. 29, 2009.

(51) Int. Cl.
 *G06G 7/48* (2006.01)
 *G06G 7/57* (2006.01)
 *G01V 1/48* (2006.01)

(52) U.S. Cl.
 CPC ........................................ *G01V 1/48* (2013.01)
 USPC .......................................................... 703/10

(58) Field of Classification Search
 None
 See application file for complete search history.

(56) References Cited

U.S. PATENT DOCUMENTS

| 5,236,040 A | 8/1993 | Venditto et al. |
| 5,838,633 A | 11/1998 | Sinha |
| 6,098,021 A | 8/2000 | Tang et al. |
| 6,351,991 B1 * | 3/2002 | Sinha .......................... 73/152.01 |
| 6,611,761 B2 | 8/2003 | Sinha et al. |
| 6,714,480 B2 | 3/2004 | Sinha et al. |
| 6,718,266 B1 * | 4/2004 | Sinha et al. ..................... 702/11 |
| 7,649,804 B2 | 1/2010 | Sinha |
| 2010/0020642 A1 * | 1/2010 | Sinha .............................. 367/75 |
| 2010/0238764 A1 * | 9/2010 | Pistre et al. ..................... 367/25 |

OTHER PUBLICATIONS

Sayers, Colin M., "An Introduction to Velocity-Based Pore-Pressure Estimation", The Leading Edge, Dec. 2006.
Gough et al., "Stress Orientations from Borehole Wall Fractures with Examples from Colorado, East Texas, and Northern Canada", National Research Council of Canada, Copyright 1982.
Harrison, et al., "Acquisition and Analysis of Sonic Waveforms from a Borehole Monopole and Dipole Source for Determination of Compressional and Shear Speeds and Their Relation to Rock Mechanical Properties and Surface Seismic Data, "Society of Petroleum Engineers, SPE 20557, 1990.

* cited by examiner

*Primary Examiner* — Suzanne Lo (57) ABSTRACT

Described is method and system of determining horizontal stress from radial profiles of dipole shear together with the far-field estimate of the Stoneley shear modulus. The system and method include selecting an optimal number of regression points on measured radial profiles for obtaining reliable estimation of maximum and minimum horizontal stress magnitudes in the presence of noisy data, where measured radial profiles of dipole shear moduli might exhibit a small amount of random fluctuations.

18 Claims, 11 Drawing Sheets

Prior Art

FIG. 12

METHOD AND SYSTEM FOR DETERMINATION OF HORIZONTAL STRESSES FROM SHEAR RADIAL VARIATION PROFILES

CLAIM FOR PRIORITY

The present application claims priority to U.S. Provisional Application Ser. No. 61/246,761, filed on Sep. 29, 2009.

BACKGROUND OF INVENTION

1. Field of the Invention

The invention relates to method and system for determining horizontal stresses from shear radial variation profiles, more particularly, the invention relates to method and system for determining horizontal stresses from shear radial variation profiles using optimal selection of radial positions, in the presence of noisy sonic data from the borehole sonic measurement.

2. Background Art

Detailed knowledge of geological formation stresses is desirable in the hydrocarbon production business, because formation stresses can affect the planning of well stimulation treatments to enhance hydrocarbon recovery as well as provide predictions of sanding and wellbore stability. In addition, formation stress information is useful in determining the long-term stability of the formation and thus helpful in determining the suitability of the formation as a repository for waste disposal. Accordingly, there is a growing demand in the industry for the estimations or determinations of formation stresses.

Figure 1:
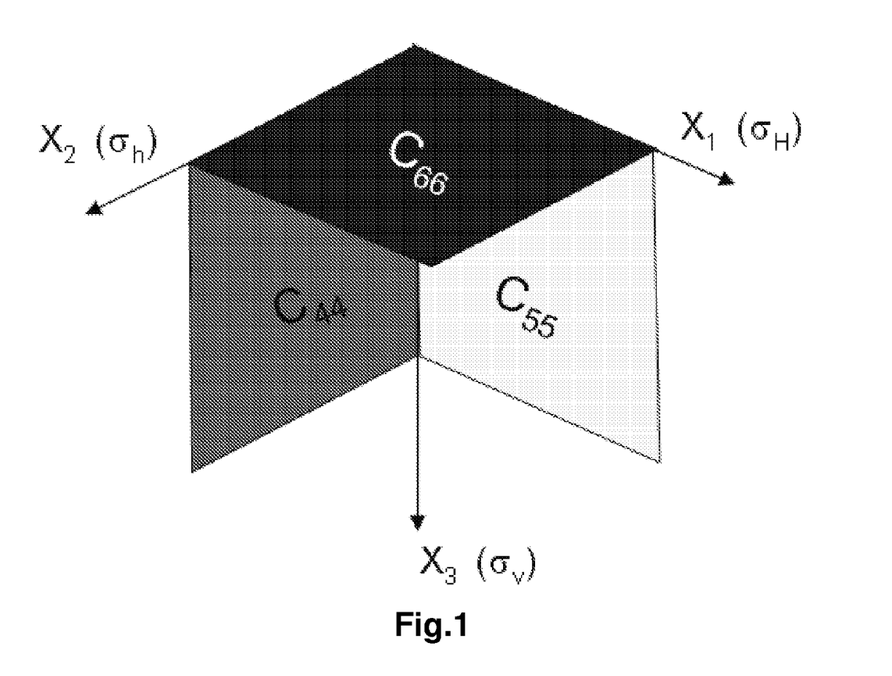
FIG. 1 shows examples of three principal stresses in the rock.

The formation stress state can be characterized by the magnitude and direction of the three principal stresses, vertical stress (overburden stress), maximum horizontal stress and minimum horizontal stress, see, for example, FIG. 1 illustrates the spatial alignment of the three principal stresses. Generally, the overburden stress yields the principal stress in the vertical direction. The overburden stress ($S_V$) can be reliably obtained by integrating the formation mass density from the surface to the depth of interest. Estimating the other two principal stresses ($S_{Hmax}$ and $S_{hmin}$) in the horizontal plane is the remaining task necessary to fully characterize the formation stress state.

Existing techniques for estimating the maximum and minimum horizontal stresses are based on analyzing borehole breakouts and borehole pressure necessary to fracture the surrounding formation, respectively. For example, U.S. Pat. No. 5,236,040, issued to Venditto, et al., discloses a method for determining the minimum principal horizontal stress within a formation by using a wireline retrievable circumferential acoustic scanning tool during an open-hole micro-fracturing test. The method includes continuously pumping fracturing fluid into a borehole while scanning the internal surface of the borehole through an acoustic scanning tool, and when fracture detected by the acoustic scanning tool, recording the fracturing fluid pressure as the magnitude of the minimum horizontal pressure.

Both borehole break-outs and hydraulic fracturing are destructive techniques that rely on assumed failure models. For example, a borehole breakout analysis can be used only in the presence of a compressive-shear failure and assumed cohesive strength and friction angle in the Mohr-Coulomb failure envelope (Gough, D. I., and Bell, J. S., 1982, Stress orientations from borehole fractures with examples from Colorado, east Texas, and northern Canada: Canadian Journal of Earth Sciences, v. 19, no. 7, p. 1358-1370). However, the hydraulic fracturing technique for the estimation of $S_{Hmax}$ requires a reliable knowledge of the rock in-situ tensile strength that is difficult to obtain.

Another approach for estimating formation stresses is using sonic log data. U.S. Pat. No. 5,838,633, issued to Sinha, discloses a method for estimating formation in-situ stress magnitude and nonlinear constants of the formation. This method includes generating two-frequency acoustic signals, receiving the signals at receiving transducers which are oriented at two orthogonal directions in a horizontal plane normal to the borehole axis, analyzing the flexural wave dispersions for dipole sources aligned parallel and perpendicular to the maximum far-field compressive stress direction and analyzing the Stoneley wave dispersion derived from a monopole source. The flexural and Stoneley wave velocities are determined as a function of frequency. In addition, the flexural wave velocities parallel and perpendicular to the far-field stress direction are determined and associated with stress induced formation anisotropy. In presence of formation and borehole stresses above and beyond those in an assumed isotropic reference state, the borehole flexural and Stoneley wave velocity dispersions are also functions of the formation stresses and nonlinear constants. The Stoneley and flexural wave velocities are defined for a hydrostatically loaded reference state. A change in the flexural and Stoneley wave velocities due to uniaxial stress is used to determine the stress magnitude and a plurality of nonlinear formation parameters.

U.S. Pat. No. 6,098,021, issued to Tang et al., discloses a method for estimating formation stresses by using a monopole and a cross dipole acoustic measurements. A radially polarized monopole guided shear-wave is generated in a borehole. It is then determined whether the shear-wave has split into two shear-waves. If it has, the difference in velocities between the two split shear-waves is used to determine the stress induced anisotropy around and near the borehole. The difference in velocities of cross-dipole shear-waves and the direction of the fast shear-wave are measured and are used to determine the magnitude of the maximum shear stress and the maximum stress orientation of the geologic formation. Furthermore, a method of determining the stress-velocity coupling coefficients from laboratory measurements as well as through field measurement calibration is disclosed. The effect of borehole pressure is taken into account, especially on the field measurement calibration method for determining the stress-velocity coupling coefficients.

Although the existing solutions provide various approaches for estimating formation stresses, accurate estimation of geological formation stresses is desirable in the hydrocarbon production business, because formation stress determination is considered critical for hydrocarbon production planning, as well as providing prediction of sanding and borehole stability. As a result, there is a growing demand in the art for accurate estimation or determination of both the two horizontal stresses.

SUMMARY OF INVENTION

In one aspect, the invention relates to method for determining horizontal stresses from shear radial variation profiles. It can be used in the presence of noisy sonic data, and using optimal selection of radial positions to determine horizontal stresses from shear radial variation profiles of borehole sonic measurement.

It is known that cross-dipole flexural dispersions exhibit crossovers in the presence of stress-induced anisotropy dominating the data. Under these conditions, radial profiles of dipole shear moduli ($C_{44}$ and $C_{55}$, which are the 2 elastic shear moduli defined in the x2-x3 vertical plane and x1-x3 vertical plane respectively, as shown in FIG. 1) together with the far-field estimate of the Stoneley shear modulus ($C_{66}$) (which is the elastic shear modulus defined in the x1-x2 horizontal plane as shown in FIG. 1) can be inverted to obtain the maximum and minimum horizontal stress magnitudes and two formation nonlinear constants. The inversion algorithm requires linear regression of shear radial variation profiles using the dipole shear moduli from far-field to the near-field of the near-wellbore stress concentration annulus. Since the near-field radial position must be selected outside of any plastically deformed region for a reliable inversion of horizontal stress, it is necessary to identify those radial positions in the measured radial profiles from sonic logging data that are not affected by any possible plastic deformation (which stands for the phenomena of non-reversible rock deformation where the elastic theory is not applicable) close to the borehole surface. According to one embodiment of the invention, a procedure for identifying such radial positions is disclosed. The procedure includes comparing measured radial profiles of dipole shear moduli with those calculated by using an acoustoelastic model that properly accounts for stress concentration effects in the absence of any plastic yielding of rock. According to one embodiment of the invention, the invention includes a workflow, which selects optimal number of regression points on measured radial profiles for obtaining reliable estimation of maximum and minimum horizontal stress magnitudes in the presence of noisy data, where measured radial profiles of dipole shear moduli might exhibit a small amount of random fluctuations.

BRIEF SUMMARY OF THE DRAWINGS

FIG. 3 shows in accordance with one embodiment of the invention.

FIG. 4 shows in accordance with one embodiment of the invention.

DETAILED DESCRIPTION

Embodiments of the invention relate to methods and systems for data processing, particularly data represented in three dimensions (3D). Embodiments of the invention are particularly useful in processing data obtained from oil and gas exploration, such as sonic logging. For clarity, the following description may use sonic measurement data prospecting to describe embodiments of the invention. However, one of ordinary skill in the art would appreciate that embodiments of the invention may also be applied to other types of data.

Embodiments of the invention relate to data obtained from dipole source in a fluid-filled borehole generating dispersive borehole flexural waves. However, one of ordinary skill in the art would appreciate that embodiments of the invention may also be applied to data obtained from other acoustic apparatus.

Figure 2:
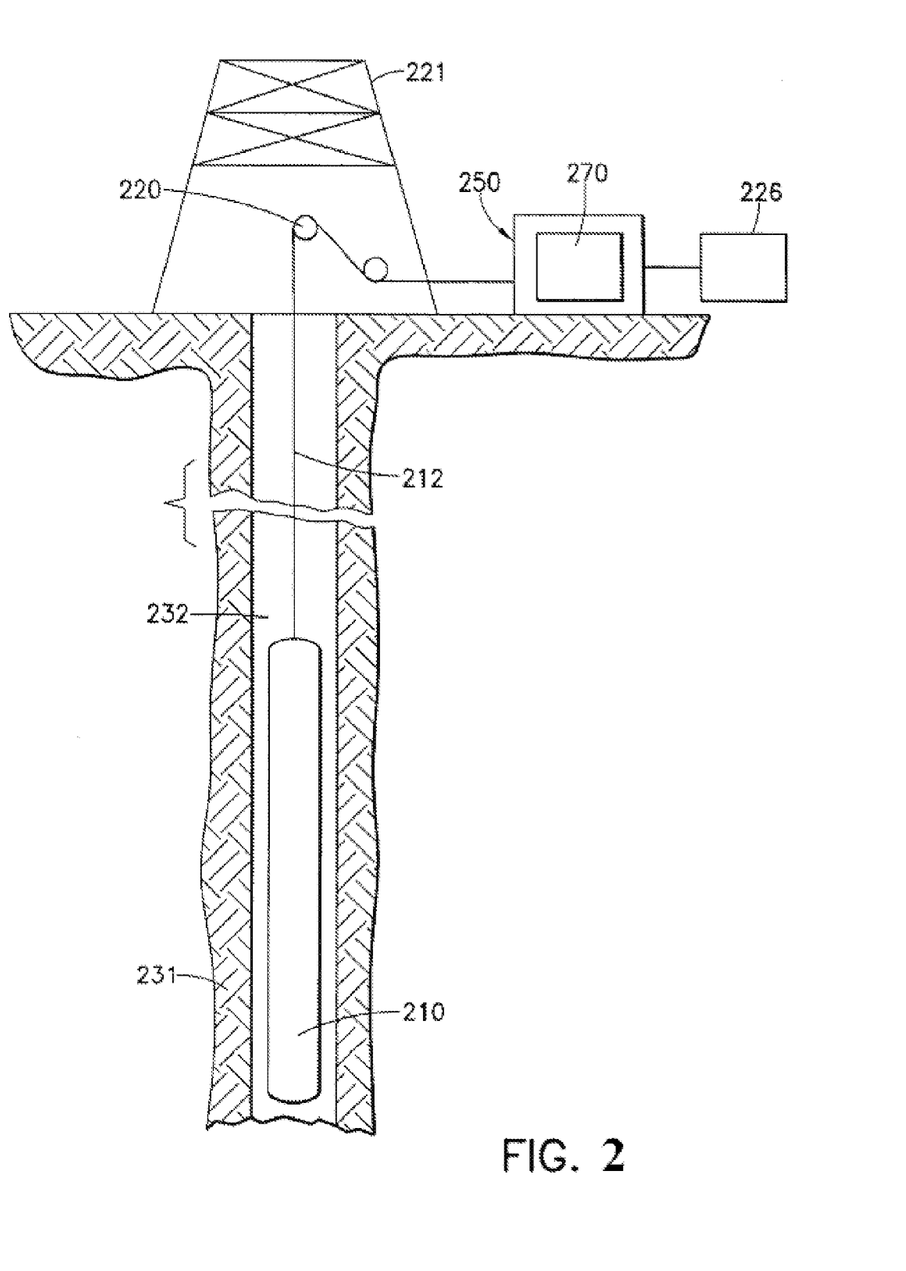
FIG. 2 shows a display of a wellsite system in which the present invention can be employed with at least one embodiment of the invention.

In the case of one of the three far-field formation principal stresses is vertical, the near-wellbore cylindrical stresses around a vertical borehole can be expressed in terms of far-field formation stresses as given by Kirsch equations (Jaeger and Cook, 1969). Considering a formation point in a cylindrical coordinate system, r, θ and z:

$$\sigma_{rr} = \frac{1}{2}(\sigma_H + \sigma_n)\left(1 - \frac{a^2}{r^2}\right) + \frac{1}{2}(\sigma_H - \sigma_n)\left(1 - 4\frac{a^2}{r^2} + 3\frac{a^4}{r^4}\right)\cos 2\theta + \frac{P_w a^2}{r^2}, \quad (1)$$

$$\sigma_{\theta\theta} = \frac{1}{2}(\sigma_H + \sigma_n)\left(1 + \frac{a^2}{r^2}\right) - \frac{1}{2}(\sigma_H - \sigma_n)\left(1 + \frac{3a^4}{r^4}\right)\cos 2\theta - \frac{P_w a^2}{r^2},$$

$$\sigma_{r\theta} = -\frac{1}{2}(\sigma_H - \sigma_n)\left(1 + 2\frac{a^2}{r^2} - 3\frac{a^4}{r^4}\right)\sin 2\theta,$$

$$\sigma_{zz} = \sigma_v - \nu(\sigma_H - \sigma_n)\frac{2a^2}{r^2}\cos 2\theta,$$

Where $\sigma_H$, $\sigma_h$, and $\sigma_v$ represent the in-situ effective stresses, and $P_w$, is defined as ($P_{mud} - P_p$). Note that the stress and pressure with negative sign represent compressional stresses. The model configuration is shown in FIG. 2.

The effective elastic stiffness coefficients $C_{ij}$ of a sedimentary rock changes as a function of principal stresses in the propagating medium. The dependency of effective elastic stiffnesses on the principal stresses can be described by an acoustoelastic model. More detailedly about the acoustoelastic model is disclosed in U.S. Pat. No. 6,351,991 issued to Sinha et al., which is incorporate herein as reference. According to this model, incremental change of the effective elastic stiffness $C_{55}$ in a formation, which is subjected to the three principal stresses, can be expressed in terms of changes in the effective stresses $\Delta\sigma_{11}$, $\Delta\sigma_{22}$, $\Delta\sigma_{33}$ as given by Eq. (2)

$$\Delta C_{55} = \frac{\Delta \sigma_{11} (\mu + C_{155} (1 - v) - C_{144} v)}{2\mu(v+1)} + \qquad (1)$$
$$\frac{\Delta \sigma_{22} (C_{144} - 2C_{155} v - \mu(2v+1))}{2\mu(v+1)} +$$
$$\frac{\Delta \sigma_{33} (\mu + C_{155} (1 - v) - C_{144} v + 2\mu(v+1))}{2\mu(v+1)},$$

where $C_{55}$ represents the shear modulus in the vertical plane defined by $x_1$ and $x_3$, $\mu$ and $\upsilon$ represent the isotropic shear modulus and Poisson's ratio in a hydrostatically loaded reference state, $C_{144}$ and $C_{155}$ are the so-called third-order elastic constants.

Considering Kirsch equations (1) along the fast shear azimuth ($x_1$ axis), the changes of effective stresses from their far field stresses are given by $$\Delta \sigma_{11}(r)|_{\theta=0} = \sigma_{rr}(r)|_{\theta=0} - \sigma_H \qquad (3)$$
$$= \frac{P_w a^2}{r^2} - \sigma_H + \frac{1}{2}\left(3\frac{a^4}{r^4} - 4\frac{a^2}{r^2} + 1\right)(\sigma_H - \sigma_h) + \frac{1}{2}\left(1 - \frac{a^2}{r^2}\right)(\sigma_h + \sigma_H),$$
$$\Delta \sigma_{22}(r)_{\theta=0} = \sigma_{\theta\theta}(r)|_{\theta=0} - \sigma_h$$
$$= \frac{-P_w a^2}{r^2} - \sigma_h - \frac{1}{2}\left(3\frac{a^4}{r^4} + 1\right)(\sigma_H - \sigma_h) + \frac{1}{2}\left(\frac{a^2}{r^2} + 1\right)(\sigma_h + \sigma_H),$$
$$\Delta \sigma_{33}(r)_{\theta=0} = \sigma_{zz}|_{\theta=0} - \sigma_v$$
$$= -2\frac{a^2 v(\sigma_H - \sigma_h)}{r^2}.$$

where a represents the radius of the borehole and r represent the distance from the center of the borehole.

Substituting Eq. (3) to Eq. (2), incremental changes in the fast shear azimuth can be expressed as $$\Delta C_{55}(r)|_{\theta=0} = \qquad (4)$$
$$\frac{-a^2}{4\mu r^2} 2(C_{144} - C_{155} - 2\mu)P_w + \frac{a^2}{4\mu r^4}(3(C_{144} - C_{155} - 2\mu)a^2 +$$
$$r^2(-4vC_{144} + C_{144} + 3C_{155} + 2\mu - 4C_{155} v + 8\mu v))\sigma_h +$$
$$\frac{a^2}{4\mu r^4}(3(-C_{144} + C_{155} + 2\mu)a^2 +$$
$$r^2(4vC_{144} + C_{144} - 5C_{155} - 6\mu + 4C_{155} v - 8\mu v))\sigma_H.$$

Defining the far field $C_{55}$ to be $C_{55}^\infty$, the radial variation of $C_{55}$ can be expressed as $$C_{55}(r)|_{\theta=0} = m_1 \frac{a^2}{r^2} + m_2 \frac{a^2}{r^4} + c_{55}^\infty, \text{ where,} \qquad (5)$$
$$m_1 = \frac{1}{4\mu}(-2(C_{144} - C_{155} - 2\mu)P_w + \qquad (6)$$
$$(-4vC_{144} + C_{141} + 3C_{155} + 2\mu - 4C_{155} v$$
$$+ 8\mu v)\sigma_h|$$

-continued
$$\left(4vC_{144} + C_{144} 5C_{155} 6\mu - \frac{1}{2}C_{155} v 8\mu v\right)\sigma_H\right),$$
$$m_2 = \frac{1}{4\mu} 3(C_{144} - C_{155} - 2\mu)(\sigma_n - \sigma_H).$$

Similarly, incremental changes in the stiffness $C_{44}$ can be expressed in terms of changes in the effective stresses $\Delta \sigma_{11}$, $\Delta \sigma_{22}$, $\Delta \sigma_{33}$ given by Eq. (7)

$$\Delta C_{44} = \frac{\Delta \sigma_{22} (\mu + C_{155} (1 - v) - C_{144} v)}{2\mu(v|1)} + \qquad (7)$$

-continued
$$\frac{\Delta \sigma_{33} (\mu + C_{155} (1 - v) - C_{144} v + 2\mu(v+1))}{2\mu(v+1)} +$$
$$\frac{\Delta \sigma_{11} (C_{144} \ 2C_{155} v \ \mu(2v|1))}{2\mu(v-1)},$$

where, $C_{44}$ represents the shear modulus in the vertical plane defined by $x_2$ and $x_3$.

Considering Kirsch equations (1) along the slow shear azimuth ($x_2$ axis), changes of effective stresses from their far field stresses are given by $$\Delta \sigma_{11}(r)|_{\theta=90} = \sigma_{\theta\theta}(r)|_{\theta=90} - \sigma_H \qquad (2)$$
$$= \frac{-P_w a^2}{r^2} - \sigma_H + \frac{1}{2}\left(\frac{3a^4}{r^4} + 1\right)(\sigma_H - \sigma_h) +$$
$$\frac{1}{2}\left(\frac{a^2}{r^2} + 1\right)(\sigma_h + \sigma_H),$$
$$\Delta \sigma_{22}(r)|_{\theta=90} = \sigma_{rr}(r)|_{\theta=90} - \sigma_h$$
$$= \frac{P_w a^2}{r^2} - \sigma_h - \frac{1}{2}\left(3\frac{a^4}{r^4} - 4\frac{a^2}{r^2} + 1\right)(\sigma_H - \sigma_h) +$$
$$\frac{1}{2}\left(1 - \frac{a^2}{r^2}\right)(\sigma_h + \sigma_H),$$

-continued $$\Delta\sigma_{33}(r)|_{\theta=90} = \sigma_{zz}(r)|_{\theta=90} - \sigma_v$$
$$= 2\frac{a^2 v(\sigma_H - \sigma_h)}{r^2}.$$

Substituting Eq. (8) into Eq. (7), incremental changes in $C_{44}$ in the slow shear azimuth can be expressed by $$\Delta C_{44} = \frac{1}{4\mu r^2} 2a^2(C_{144} - C_{155} - 2\mu)P_w +$$
$$\frac{1}{4\mu r^4} a^2(3(-C_{144} + C_{155} + 2\mu)a^2 +$$
$$r^2(4vC_{144} + C_{144} - 5C_{155} - 6\mu + 4C_{155}v - 8\mu v))\sigma_h +$$
$$\frac{1}{4\mu r^4} a^2(3(C_{144} - C_{155} - 2\mu)a^2 +$$
$$r^2(-4vC_{144} + C_{144} + 3C_{155} + 2\mu - 4C_{155}v + 8\mu v))\sigma_H. \quad (9)$$

Denoting the far-field $C_{44}$ as $C_{44}^\infty$, the radial variation of $C_{44}$ can be expressed as $$C_{44}(r)|_{\theta=90} = m_3 \frac{a^2}{r^2} + m_4 \frac{a^4}{r^4} + C_{44}^\infty \quad (10)$$

where, $$m_3 = \frac{1}{4\mu}(-2(C_{144} - C_{155} - 2\mu)P_w +$$
$$(4vC_{144} - 5C_{155} - 6\mu + 4C_{155}v - 8\mu v)\sigma_h +$$
$$(-4cV_{144} + C_{144} + 3C_{155} + 2\mu - 4C_{155}v + 8\mu v)\sigma).$$

$$m_4 = -\frac{1}{4\mu} 3(C_{144} - C_{155} - 2\mu)(\sigma_h - \sigma_H). \quad (11)$$

for simplicity, an acoustoelastic parameter, $A_E$, is defined as an combination of $C_{144}$, $C_{155}$, and $\mu$, $$A_E = 2 - \frac{C_{155} - C_{144}}{2\mu} \quad (12)$$

It is known that there are 2 independent equations that relate changes in the shear moduli to corresponding changes in the effective principal stresses in a homogeneously stressed formation as would be the case in the far-field $$-C_{55}^\infty - C_{44}^\infty + 2C_{66}^\infty = A_E(-2\sigma_{98} + \sigma_H + \sigma_h)$$

$$C_{55}^\infty - C_{44}^\infty = (A_E - 1)(\sigma_H - \sigma_h) \quad (13)$$

Substituting Eq. (13) into Eq. (6) and Eq. (11), we can compute $m_2$ and $m_4$ as $$m_2 = \frac{3}{2}(A_E - 1)(\sigma_H - \sigma_h) = \frac{3}{2}(C_{55}^\infty - C_{44}^\infty) \quad (14)$$
$$m_4 = -m_2$$

Based on Eq. (14), Eq. (5) and Eq. (10) can be rewritten as $$C_{55}(r)|_{\theta=0} = m_1 \frac{a^2}{r^2} + \frac{3}{2}(C_{55}^\infty - C_{44}^\infty)\frac{a^4}{r^4} + C_{55}^\infty \quad (15)$$

$$C_{44}(r)|_{\theta=90} = m_3 \frac{a^2}{r^2} - \frac{3}{2}(C_{55}^\infty - C_{44}^\infty)\frac{a^4}{r^4} + C_{44}^\infty$$

As $C_{55}(r)$ and $C_{44}(r)$ can be computed from the so-called shear radial variation profile (SRVP) which is inverted directly from the sonic dipole logging dispersion analysis, $m_1$ and $m_3$ an then be obtained from the linear regression (Least Square Fitting method) of radial profiles of shear moduli $C_{44}$ and $C_{55}$ using Eq. (15).

To avoid use of any radial position in a possible plastic zone in the radial profiles of shear moduli ($C_{44}$ and $C_{55}$), the proposed regression method attempts to use as many radial points as possible starting from the far-field (r/a=7). The number of radial points to be used (denoted by $N_p$), which starts from the far-field (r/a=7) to a near-field (say, r/a=2.5), is determined by the following search criteria that provide optimal estimates of m (here m can be used to denote either $m_1$ or $m_3$)

$$\begin{cases} \frac{dm}{dN_p} = 0 \\ \frac{d^2 m}{dN_p^2} > 0 \end{cases} \quad (16)$$

Adding $m_1$ of Eq. (6) to $m_3$ of Eq. (11) results in the following relation among the horizontal stresses and wellbore pressure $P_W$ $$m_1 + m_3 = -(A_E - 1)(-2P_w + \sigma_h + \sigma_H). \quad (17)$$

Combining Eq. (17) with Eq. (13), the 2 horizontal stresses, $\sigma_H$ and $\sigma_h$ is presented by:

$$\sigma_H - \sigma_h - \frac{C_{55}^\infty - C_{44}^\infty}{A_E - 1}, \quad (18)$$

$$\sigma_h \approx \sigma_v - \frac{C_{55}^\infty C_{66}^\infty}{A_E - 1},$$

$$A_E = -A_2 + \frac{\sqrt{A_2^2 - 4A_1 A_3}}{2A_1},$$

where, $$A_1 = 2(-P_w + \sigma_v)$$
$$A_2 = -(C_{44}^\infty + C_{55}^\infty - 2C_{66}^\infty - m_1 - m_3 - 2P_w + 2\sigma_v),$$
$$A_3 = C_{44}^\infty + C_{55}^\infty - 2C_{66}^\infty.$$

According to one embodiment of the invention, the method for estimating both the maximum and minimum horizontal stress magnitudes uses borehole sonic data obtained from a vertical or nearly vertical wellbore, as shown in FIG. 2. Subsurface formations 231 are traversed by a borehole 232, which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided for measuring cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions—not separately shown), standard peripheral equipment (not separately shown), and recorder 226.

Figure 3:
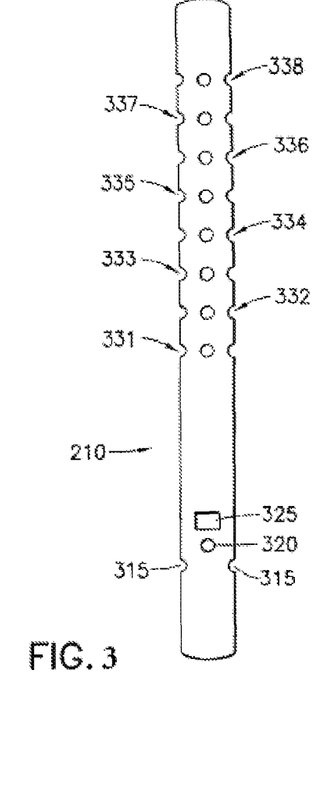
Figure 4:
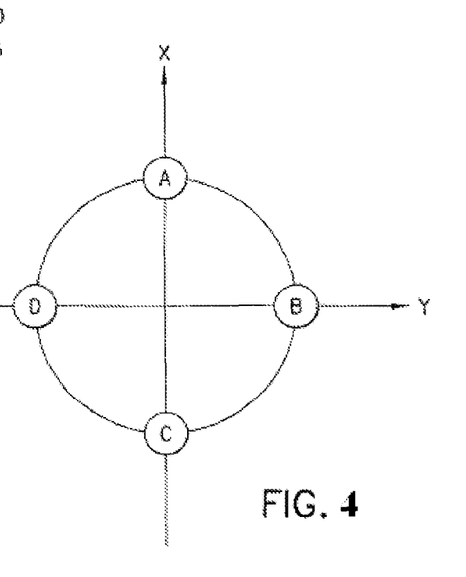

According to one embodiment of the invention, the logging device 210 may be, for example, of a type known as a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. It will be understood, however, that any suitable logging device can be utilized. Further details of the logging device 210 of this example are shown in FIG. 3. The logging device 210 includes crossed dipole transmitters 315 and 320 (only one end of dipole 320 being visible) and a monopole transmitter 325, so that waves including compressional, shear, Stoneley, and flexural can be excited. Eight, or other suitable number, of spaced apart receiver stations, designated 331 through 338 each comprise four receiver hydrophones mounted azimuthally at ninety-degree intervals in the surface of the cylindrical logging device. FIG. 4 shows the top view of the hydrophones, designated A, B, C, and D, according to the embodiment also shown in FIG. 3.

According to one embodiment of the invention, a system for acoustic data acquisition and processing is shown in FIG. 4. An X component can be obtained by subtracting the signals received at A and C (i.e., A-C), and a Y component can be obtained by subtracting the signals received at B and D (i.e., B-D). With four receiver elements at each receiver station, there are a total of thirty two receiver elements in this example. The receiver stations are also configurable for monopole reception.

The transmitter electronics include a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics process the signals from the 32 individual receiver elements located at the eight receiver stations which are spaced six inches apart. At each station, four receivers are mounted as shown in FIG. 3 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexers, filters, amplifies and channels the signals from the 32 receiver elements to 8 parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 5:
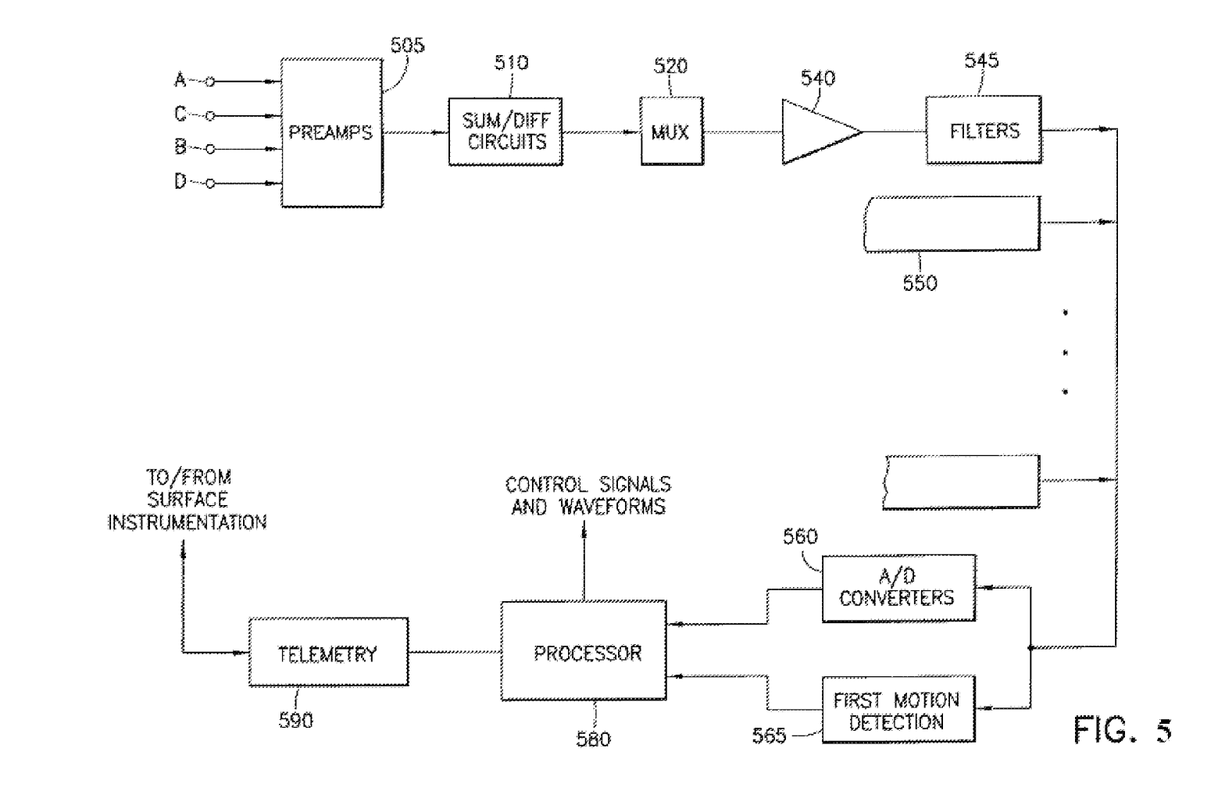
FIG. 5 shows a display of a sonic logging device that can be used with at least one embodiment of the invention.

As shown in FIG. 5, an example of the acquisition signal path, for one of the eight (or other suitable number of) receiver stations, is illustrated in block diagram, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. If desired, more bits can, of course, be used to advantage. After digitization, the eight waveforms are passes to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590. It will be understood that more advanced tool implementations, having further transmitters, receivers, and/or transmitter-to-receiver (T/R) spacings, and more powerful processing capabilities, can be used even more advantageously, consistent with the principles hereof, in practicing embodiments of the invention.

Figure 6:
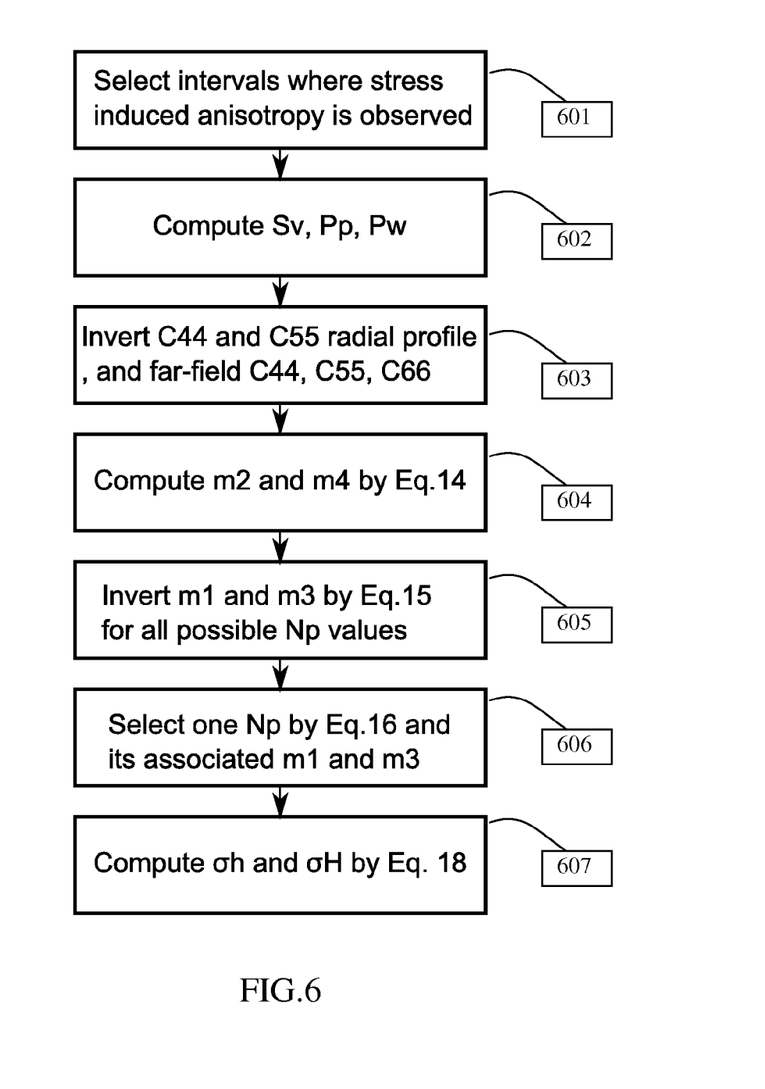
FIG. 6 shows a workflow for generating horizontal stress magnitudes in accordance with one embodiment of the invention.

According to one embodiment of the invention, a work flow for calculating horizontal stresses, as shown in FIG. 6, starts with selecting formation intervals where there is stress induced anisotropy 601. Computing vertical stress Sv, pore pressure $P_p$ and mud pressure $P_w$ 602. The vertical stress Sv can be computed by integrating the density log data, wherein the measurement of rock bulk density can be performed using standard nuclear logging tools from the surface to the depth of interest (and then integrated over depth.) The pore pressure $P_p$ can be computed by using standard models or correlations, wherein the models or the correlations are suitable for the field and calibrating the results with available data or measurement, more details of the method for computing pore pressure is disclosed by Colin M. Sayers, An introduction to velocity-based pore-pressure estimation. 1496-1500, The Leading Edge, 2006, the entire teaching is incorporated herein. The $P_w$ can be computed by ($P_{mud}$-$P_p$). $C_{44}$ and $C_{55}$ are the two shear moduli that can be obtained from the slow and fast dipole flexural dispersions, more details of the method of obtaining shear moduli $C_{44}$ and $C_{55}$ is disclosed by the commonly owned U.S. Pat. No. 6,718,266, Determination of dipole shear anisotropy of earth formations, issued to Sinha, et al., the entire teaching is incorporated herein. $C_{66}$ can be inverted from tube wave velocity, which is disclosed by the commonly owned U.S. Pat. No. 6,714,480 issued to Sinha, the entire teaching is incorporated herein. The far field shear moduli $C_{44}^\infty$ and $C_{55}^\infty$ are computed based on slow and fast dipole flexural dispersions obtained from far field. According to the current embodiment, the far-field is defined as r/a=7, where r represent distance to the center of the borehole, and a represent radius of the borehole. Based on the far field shear moduli $C_{44}^{\infty}$ and $C_{55}^{\infty}$, $m_2$ and m4 can be calculated through Equation (14), step 604.

Figure 7:
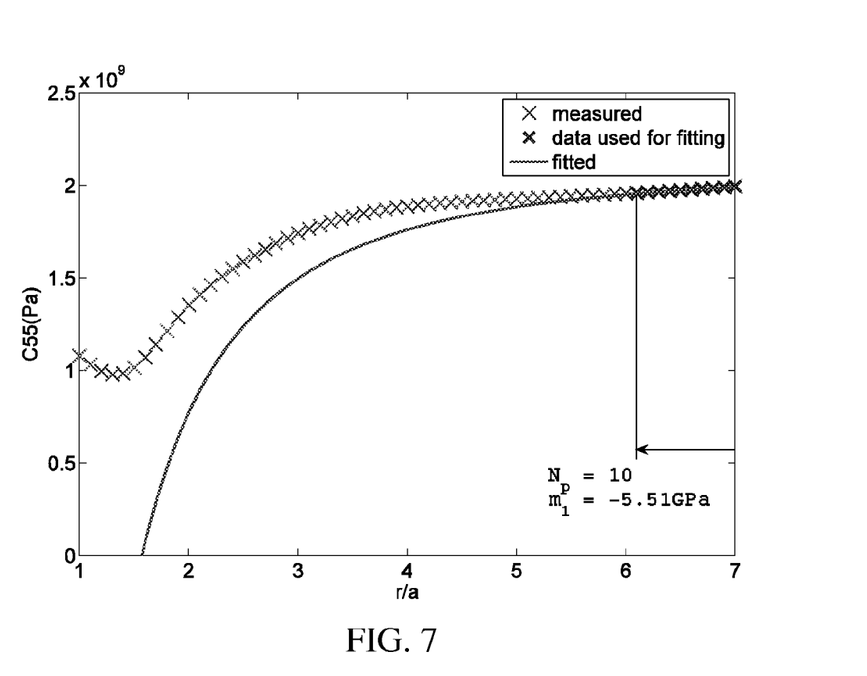
FIG. 7 shows shear moduli $C_{55}$ values fitted from measured shear velocities with various radials and the number of regression points set to 10.

Then, $C_{55}(r)$ and $C_{44}(r)$ can be computed from the shear radial variation profile (SRVP). The procedure for generating shear radial variation profile includes using a number of flexural velocity data at several frequencies, calculating wavenumber of each frequency, computing fractional changes in flexural velocity; computing fractional changes in shear modulus and outputting radial variation in formation shear profile. More details of the procedure for generating shear radial variation profile is described in the commonly owned U.S. Pat. No. 6,611,761, Sonic well logging for radial profiling, issued to Sinha et al., which is incorporate herein. As shown in FIG. 7, the radial ranges from r/a=1 to r/a=7, the profile of shear moduli $C_{55}$ are represented by crosses and denoted as "measured."

Figure 8:
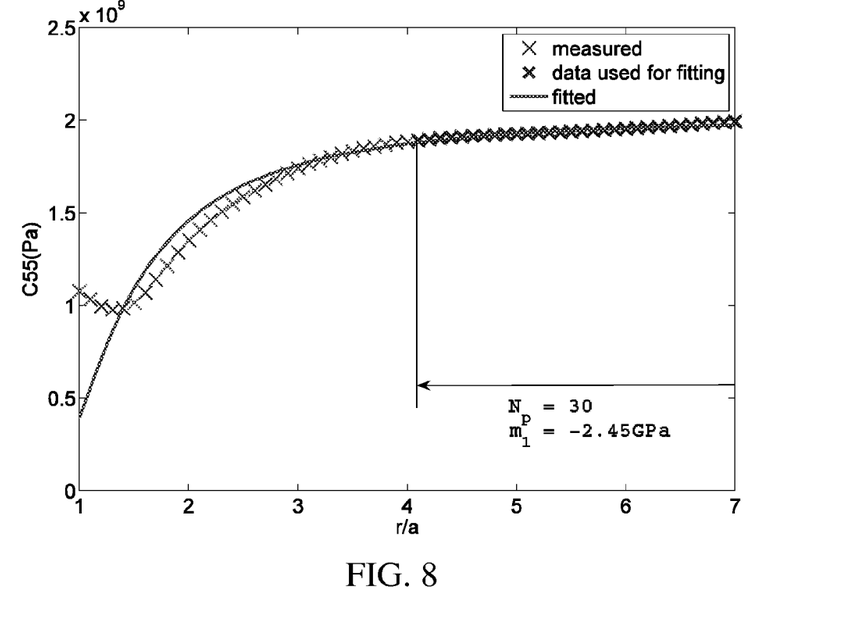
FIG. 8 shows shear moduli $C_{55}$ values fitted from measured shear velocities with various radials and the number of regression points set to 30.
Figure 9:
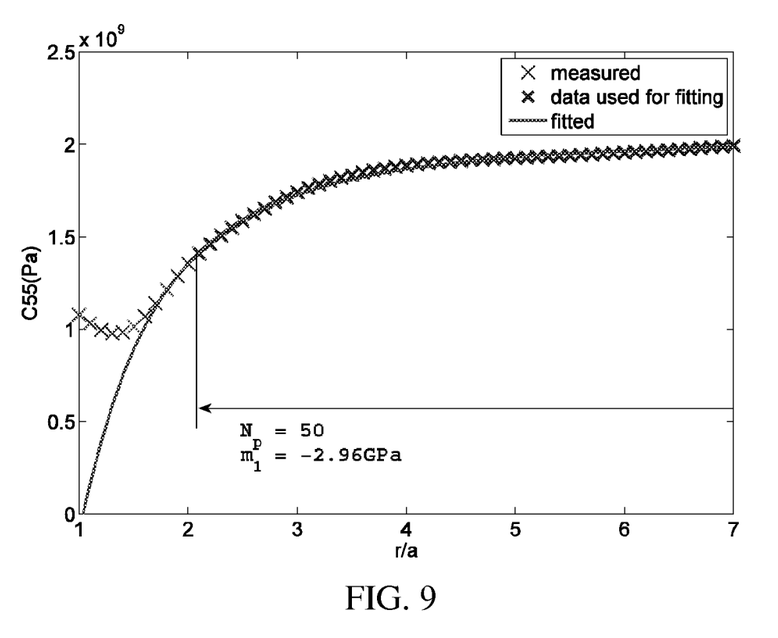
FIG. 9 shows shear moduli $C_{55}$ values fitted from measured shear velocities with various radials and the number of regression points set to 50.

According to one embodiment of the invention, the work flow for calculating horizontal stresses also includes generating $m_1$ and $m_3$ from the linear regression of radial profiles of shear moduli $C_{44}$ and $C_{55}$ using Eq. (15), step 605. For example, FIGS. 7-9 show shear moduli $C_{55}$ values obtained from measured shear velocities with various radials, which are presented as crosses. Apparently, the "measured" values, possess fluctuations and a curve fitting is necessary. The curve fitting is performed by first selecting a number of regression points Np. For example, Np is set to 10 in FIG. 7. Then, using the conditions defined by Equation (16), and Equation (15), m1 can be obtained by standard linear regression technique (Least Square Fitting method). In this case, m1=−5.51 GPa, when Np=10. Similarly, as shown in FIG. 8, m1=−2.45 GPa, when Np=30. As shown in FIG. 9, m1=−2.95 GPa, when Np=50.

Figure 10A:
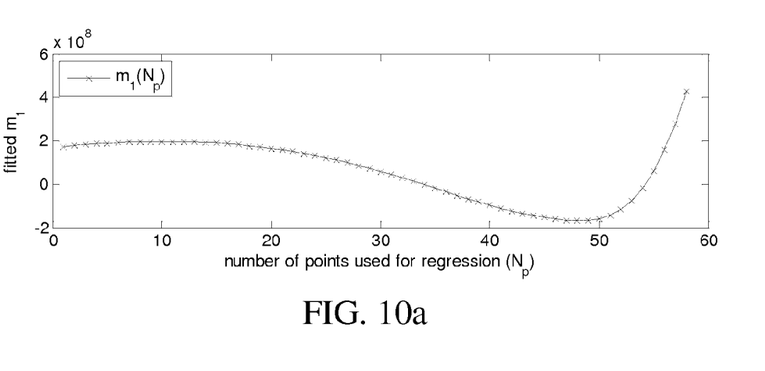
FIG. 10a-10c show an example of the Np selecting process.
Figure 10B:
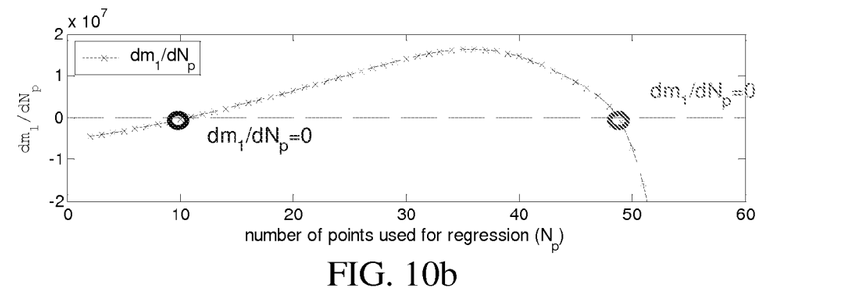
Figure 10C:
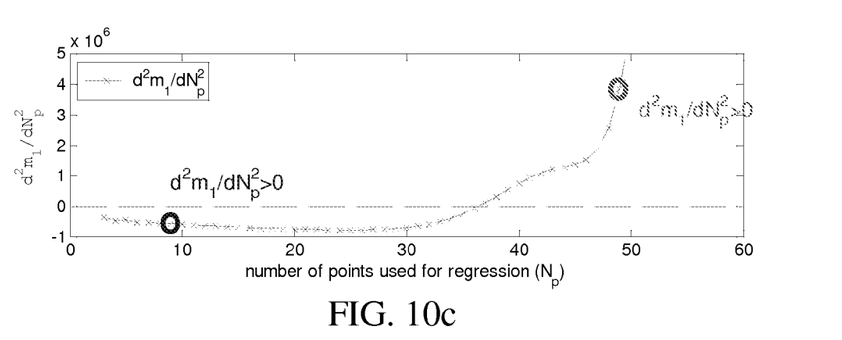

As shown in FIG. 10*a-c*, an example for the Np selecting process according to one embodiment of the invention is given. Firstly, in the plot of FIG. 10*a* where the x axis denotes Np and the y axis denotes m1, it is clear that $m_1$ is a function of Np such that different Np values give different $m_1$ values. Then in the plot of FIG. 10*b* where the x axis denotes Np and the y axis denotes the first derivative of $m_1$, there are 2 crossover points (Np=10, and Np=50 respectively) satisfying the first criteria (i.e. dm/dNp=0). Finally, in the plot of FIG. 10*c* where the x axis denotes Np and the y axis denotes the second derivative of $m_1$, the point below the zero line gives negative value of second derivative of $m_1$, while the point above the zero line gives positive value. Therefore, according to second criteria in Eq.16, the Np value and its associated $m_1$ corresponding to point at Np=50 is selected as optimal values for computing 2 horizontal stresses.

Figure 11A:
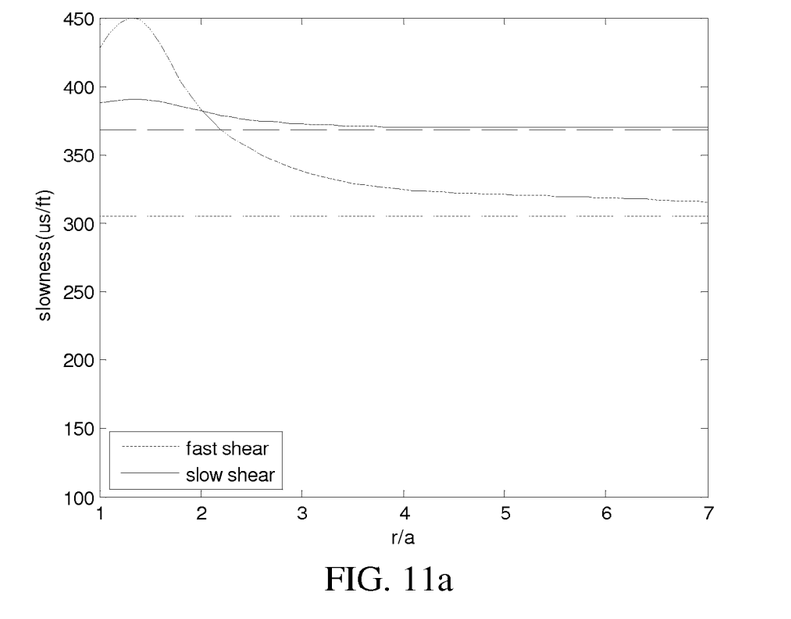
FIG. 11a-11d show an example of linear regression result to get $m_1$ and $m_3$ from sonic dipole dispersion data
Figure 11B:
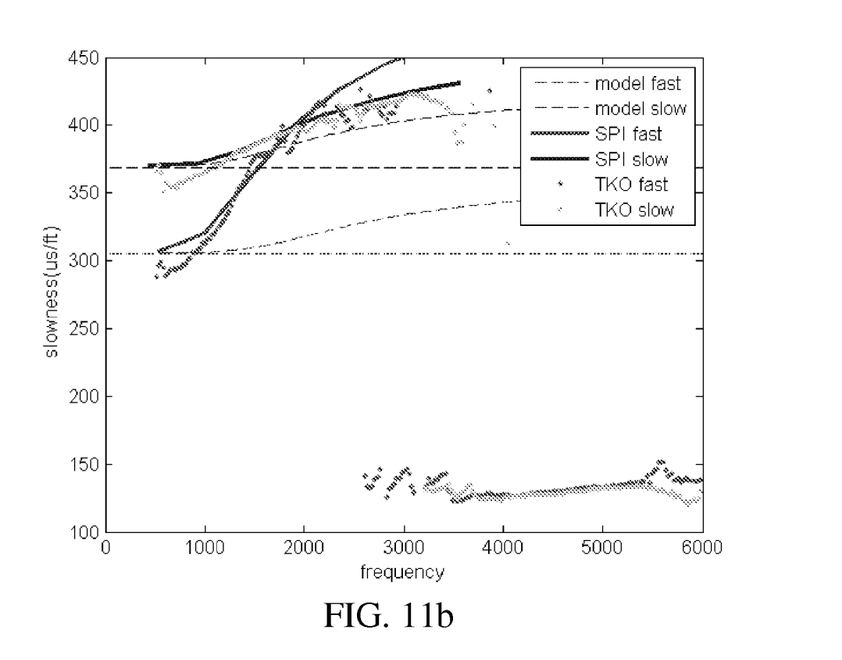
Figure 11C:
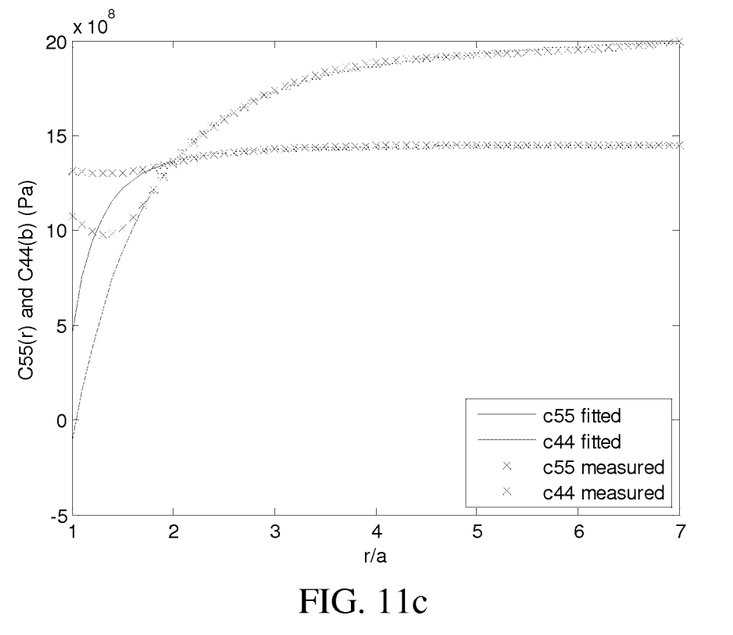
Figure 11D:
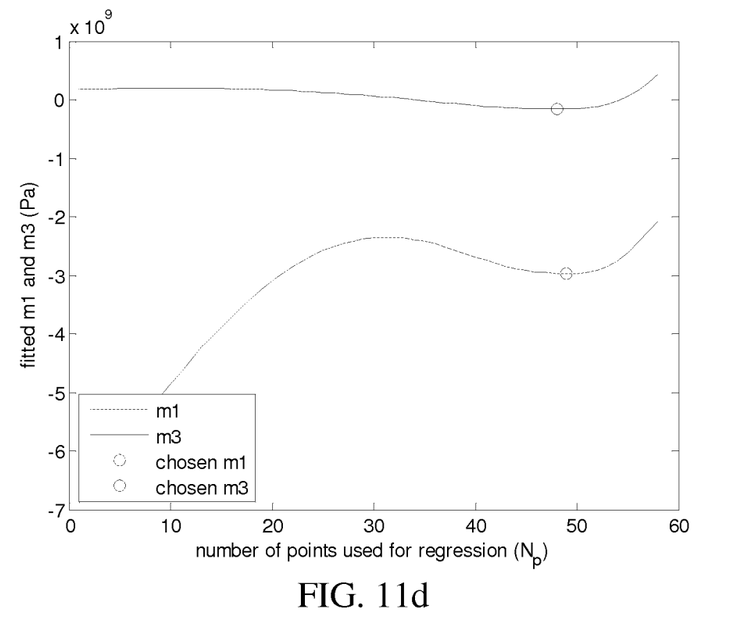

As shown in FIG. 11*a-d*, an example of linear regression result to get $m_1$ and $m_3$ from sonic dipole dispersion data in accordance with the embodiment of the present invention. FIG. 11*a* illustrates a shear radial variation profile obtained from a Sonic Scanner® (the Schlumberger Sonic Logging tool). FIG. 11*b* illustrates the extracted Sonic Scanner's Dipole flexural dispersion curves in fast and slow azimuth (solid lines). FIG. 11*c* illustrates shear moduli $C_{44}$ and $C_{55}$ radial profiles (marked with 'X') and the inverted profiles by model of Eq. (5) and Eq. (10) (Solid lines). FIG. 11*d* illustrates $m_1$ and $m_3$ inverted by using Eq. (16).

The work flow for calculating horizontal stresses also includes selecting Np through Equation (16), step 606. With m1, m2, m3 and m4 obtained, the maximum horizontal stress and minimum horizontal stress can be calculated by using Equation (18), step 607.

Figure 12:
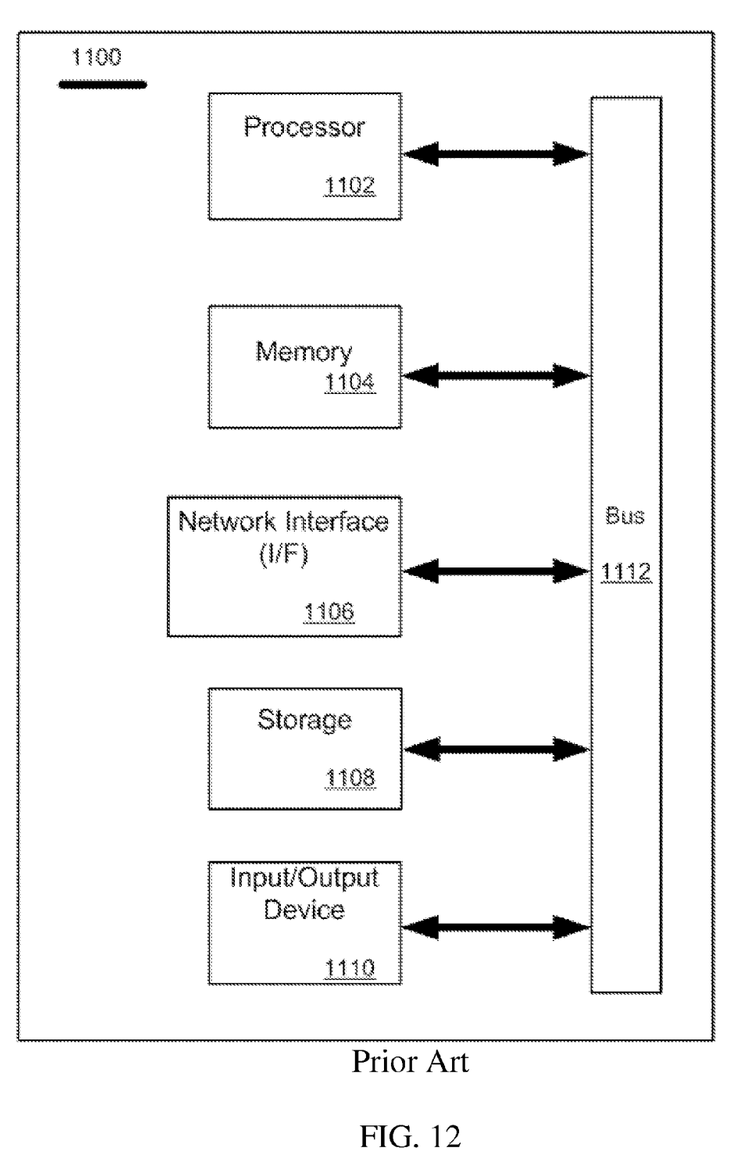
FIG. 12 shows a schematic illustration of a computer system for use in conjunction with at least one embodiment of the present invention.

According to one embodiment of the invention, a system for estimating in-situ stress is shown in FIG. 12. The system includes processor 1102, which is coupled to bus 1112 for performing the steps shown in FIG. 6, such as, computing vertical stress Sv, pore pressure $P_p$, mud pressure $P_w$, computing shear modulus $C_{44}$, $C_{55}$ and $C_{66}$, computing $m_1$, $m_2$, $m_3$, $m_4$ and computing horizontal stresses. According to another embodiment shown in FIG. 5, the processing of signals recorded uphole can be implemented using a processor 580, such as a suitably programmed general purpose digital processor with memory and peripherals conventionally provided. It will be understood, however, that the processing need not be performed at the wellsite, and that signals derived at the wellsite can be processed at a remote location. It will also be understood that other suitable logging tools can be employed in practicing the invention.

Memory 1104 (also referred to as a computer-readable medium) is coupled to bus 1112 for storing data, such as, sonic log data, vertical stress Sv, pore pressure $P_p$, mud pressure $P_w$, shear modulus $C_{44}$, $C_{55}$ and $C_{66}$, $m_1$, $m_2$, $m_3$, $m_4$, Equations 1-18 and instructions to execute the workflow as shown in FIG. 6 by processor 1102. Memory 1104 also may be used for storing temporary variables or other intermediate information during execution of instructions to be executed by processor 1102. Memory 1104 may also comprise a read only memory (ROM) or other static storage device coupled to bus 1112 for storing static information and instructions for processor 1102.

Network I/F 1106 comprises a mechanism for connecting to another device. In at least some embodiments, system 1100 comprises more than a single network interface.

A storage device (storage 1108), such as a magnetic disk or optical disk, may also be provided and coupled to the bus 1112 for storing data and/or instructions to execute the workflow as shown in FIG. 6.

I/O device may comprise an input device, an output device and/or a combined input/output device for enabling user interaction with system 1100, such as step 601, selecting an interval of the formation having stress induced anisotropy. An input device may comprise, for example, a keyboard, keypad, mouse, trackball, trackpad, cursor direction keys and/or an A/D card for receiving log data, sonic log data and Geological field data as afore described and communicating information and commands to processor 1102. An output device may comprise, for example, a display, a printer, a voice synthesizer and/or a D/A card for outputting in-situ stress or in-situ stress regime, and communicating information to a user.

The functions of a method or the workflow described in connection with the embodiments disclosed herein may be embodied in hardware, executable instructions embodied in a computer-readable medium, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method for structural modeling formation stresses, comprising:
   selecting an interval of the formation having stress induced anisotropy within a borehole;

computing model parameters $m_1$ and $m_3$ by linear regression of radial profiles of shear moduli $C_{44}$ and $C_{55}$ using a computer wherein the model parameters $m_1$ and $m_3$ are obtained using a model;

computing and outputting a maximum horizontal stress $\sigma_H$ and minimum horizontal stress $\sigma_h$ using the computer wherein the maximum horizontal stress $\sigma_H$ and minimum horizontal stress $\sigma_h$ are determined from a series of equations:

$$\sigma_H = \sigma_h + \frac{C_{55}^\infty - C_{44}^\infty}{A_E - 1}, \quad (3)$$

$$\sigma_h \approx \sigma_v - \frac{C_{55}^\infty - C_{66}^\infty}{A_E - 1},$$

$$A_E = -A_2 + \frac{\sqrt{A_2^2 - 4A_1 A_3}}{2A_1},$$

where, $$A_1 = 2(-P_w + \sigma_v)$$

$$A_2 = -(C_{44}^\infty + C_{55}^\infty - 2C_{66}^\infty - m_1 - m_3 - 2P_w + 2\sigma_v),$$

$$A_3 = C_{44}^\infty + C_{55}^\infty - 2C_{66}^\infty.$$

$P_W = (P_{mud} - P_p)$ $P_{mud}$ represents mud pressure in the borehole, $P_p$ represents pore pressure in the borehole, $\sigma_v$ represents vertical stress of the formation, $A_E$ represents an acoustical parameter, $C_{44}^\infty$ represents a far field slow shear modulus defined as r/a=7, where r represents a distance to the center of the borehole, a represents a radius of the borehole $C_{55}^\infty$ represents a far field fast shear modulus defined as r/a=7, and $C_{66}^\infty$ represents a far field Stonely shear modulus.

2. The method of claim 1, wherein the linear regression includes Least Square Fitting.

3. The method of claim 2, wherein the Least Square Fitting further comprises inverting $m_1$ and $m_3$ based on equations:

$$C_{55}(r)|_{\theta=0} = m_1 \frac{a^2}{r^2} + \frac{3}{2}(C_{55}^\infty - C_{44}^\infty)\frac{a^4}{r^4} + C_{55}^\infty \text{ and}$$

$$C_{44}(r)|_{\theta=90} = m_3 \frac{a^2}{r^2} - \frac{3}{2}(C_{55}^\infty - C_{44}^\infty)\frac{a^4}{r^4} + C_{44}^\infty,$$

wherein $C_{55}(r)|_{\theta=0}$ and $C_{44}(r)|_{\theta=90}$ represent radial profiles of shear moduli $C_{44}$ and $C_{55}$.

4. The method of claim 3, wherein the far field shear moduli $C_{44}^\infty$, $C_{55}^\infty$ and $C_{66}^\infty$ are derived based on slow and fast dipole flexural dispersions obtained from far field.

5. The method of claim 2, wherein the Least Square Fitting further comprises selecting an optimal amount of radial points Np on the radial profiles of shear moduli $C_{44}$ and $C_{55}$.

6. The method of claim 4, wherein Np is determined by the following search criteria:

$$\begin{cases} \frac{dm}{dN_p} = 0 \\ \frac{d^2 m}{dN_p^2} > 0 \end{cases}$$

wherein, m represents either $m_1$ or $m_3$, and Np represents an optimal amount of radial points.

7. The method of claim 6, wherein the model parameters $m_1$ and $m_3$ are the inverting results associated with the optimal amount of radial points Np.

8. The method of claim 7, wherein mud pressure $P_{mud}$ and pore pressure $P_p$ are derived from log data.

9. The method of claim 7, wherein the vertical stress $\sigma_v$ is obtained by integrating the density log data.

10. A system for structural modeling formation stresses, comprising a processor and a memory that store a program having instructions for:

selecting an interval of the formation having stress induced anisotropy within a borehole;

computing model parameters $m_1$ and $m_3$ by linear regression of radial profiles of shear moduli $C_{44}$ and $C_{55}$ wherein the model parameters $m_1$ and $m_3$ are obtained using a model;

computing and outputting a maximum horizontal stress $\sigma_H$ and minimum horizontal stress $\sigma_h$ wherein the maximum horizontal stress $\sigma_H$ and minimum horizontal stress $\sigma_h$ are determined from a series of equations:

$$\sigma_H = \sigma_h + \frac{C_{55}^\infty - C_{44}^\infty}{A_E - 1}, \quad (4)$$

$$\sigma_h \approx \sigma_v - \frac{C_{55}^\infty - C_{66}^\infty}{A_E - 1},$$

$$A_E = -A_2 + \frac{\sqrt{A_2^2 - 4A_1 A_3}}{2A_1},$$

where, $$A_1 = 2(-P_w + \sigma_v)$$

$$A_2 = -(C_{44}^\infty + C_{55}^\infty - 2C_{66}^\infty - m_1 - m_3 - 2P_w + 2\sigma_v),$$

$$A_3 = C_{44}^\infty + C_{55}^\infty - 2C_{66}^\infty.$$

$P_W = (P_{mud} - P_p)$ $P_{mud}$ represents mud pressure in the borehole, $P_p$ represents pore pressure in the borehole, $\sigma_v$ represents vertical stress of the formation, $A_E$ represents an acoustical parameter, $C_{44}^\infty$ represents a far field slow shear modulus defined as r/a=7, where r represents a distance to the center of the borehole, a represents a radius of the borehole $C_{55}^\infty$ represents a far field fast shear modulus defined as r/a=7, and $C_{66}^\infty$ represents a far field Stonely shear modulus.

11. The system of claim 10, wherein the linear regression includes Least Square Fitting.

12. The system of claim 11, wherein the Least Square Fitting further comprises inverting $m_1$ and $m_3$ based on equations:

$$C_{55}(r)|_{\theta=0} = m_1 \frac{a^2}{r^2} + \frac{3}{2}(C_{55}^{\infty} - C_{44}^{\infty})\frac{a^4}{r^4} + C_{55}^{\infty} \text{ and}$$

$$C_{44}(r)|_{\theta=90} = m_3 \frac{a^2}{r^2} - \frac{3}{2}(C_{55}^{\infty} - C_{44}^{\infty})\frac{a^4}{r^4} + C_{44}^{\infty},$$

wherein $C_{55}(r)|_{\theta=0}$ and $C_{44}(r)|_{\theta=90}$ represent radial profiles of shear moduli $C_{44}$ and $C_{55}$.

13. The system of claim 12, wherein the far field shear moduli $C_{44}^{\infty}$, $C_{55}^{\infty}$ and $C_{66}^{\infty}$ are derived based on slow and fast dipole flexural dispersions obtained from far field.

14. The system of claim 11, wherein the Least Square Fitting further comprises selecting an optimal amount of radial points Np on the radial profiles of shear moduli $C_{44}$ and $C_{55}$.

15. The system of claim 13, wherein Np is determined by the following search criteria:

$$\begin{cases} \dfrac{dm}{dN_p} = 0 \\ \dfrac{d^2 m}{dN_p^2} > 0 \end{cases}$$

wherein, m represents either $m_1$ or $m_3$, and Np represents an optimal amount of radial points.

16. The system of claim 15, wherein the model parameters $m_1$ and $m_3$ are the inverting results associated with the optimal amount of radial points Np.

17. The system of claim 16, wherein mud pressure $P_{mud}$ and pore pressure $P_p$ are derived from log data.

18. The system of claim 16, wherein the vertical stress $\sigma_v$ is obtained by integrating the density log data.

* * * * *